July 21, 1925.

N. J. DAYSH 1,546,437

COMBINED MILK RELEASER AND MILK MEASURING DEVICE

Original Filed Oct. 11, 1922   3 Sheets-Sheet 1

WITNESS:

INVENTOR
Norman John Daysh
BY
Frank S. Busser
ATTORNEY

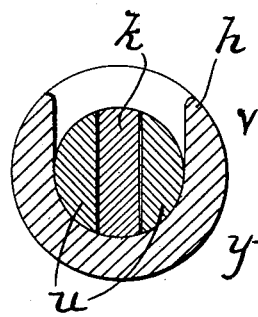
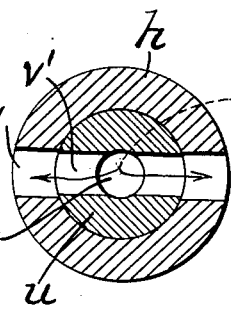
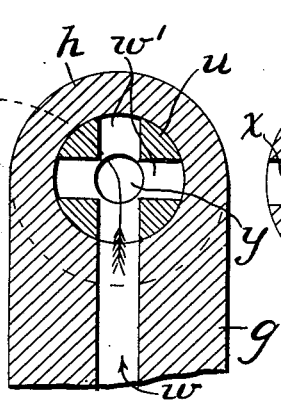
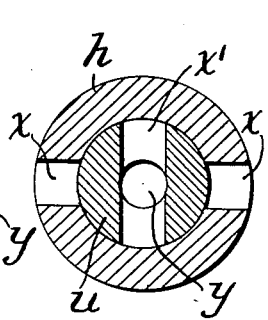
FIG.3.   FIG.4.   FIG.5.   FIG.6.
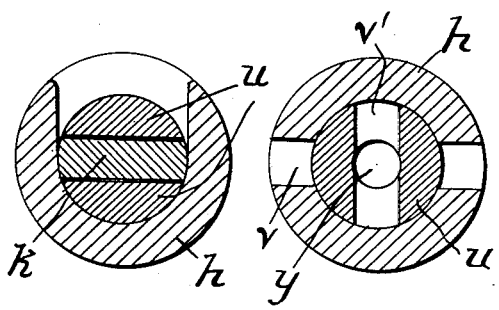
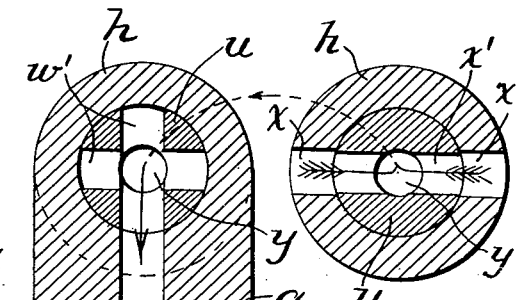
FIG.3ª.   FIG.4ª.   FIG.5ª.   FIG.6ª.
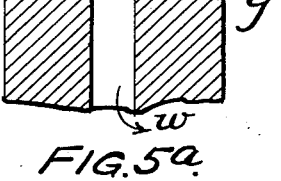
FIG.7.

Patented July 21, 1925.

1,546,437

UNITED STATES PATENT OFFICE.

NORMAN JOHN DAYSH, OF NEW YORK, N. Y., ASSIGNOR TO THE DE LAVAL SEPARATOR COMPANY, OF NEW YORK, N. Y., A CORPORATION OF NEW JERSEY.

COMBINED MILK RELEASER AND MILK-MEASURING DEVICE.

Application filed October 11, 1922, Serial No. 593,692. Renewed December 23, 1924.

*To all whom it may concern:*

Be it known that I, NORMAN JOHN DAYSH, a subject of the King of Great Britain, residing at New York city, county of New York, and State of New York, have invented a new and useful Improvement in Combined Milk Releaser and Milk-Measuring Devices, of which the following is a full, clear, and exact description, reference being had to the accompanying drawings, which form a part of this specification.

It is known, in milking machines, to discharge milk from a passage under vacuum to a receptacle open to the atmosphere by interposing a milk releaser, which permits such discharge without breaking down the vacuum in the milk passage. It is also known to provide, somewhere in the course of flow of the milk, a milk-measuring device to automatically measure the milk from each cow or from a number of cows. The object of my invention is to so combine a measuring device with a releaser that the operation of the releaser will be controlled by the measuring device, and to do this in such manner as to produce a structure substantially simpler than would be involved in the arrangement in series of a measuring device and a releaser independently operable, and also to simplify the construction of the releaser and its controlling mechanism. Another object of the invention is to so construct the measuring device that the amount of accumulated milk required to operate it will be determined with more precision than heretofore and will be substantially invariable.

A known form of measuring device comprises a bucket so pivoted on its axis that it will assume a receiving position when empty and so shaped that as milk accumulates therein the center of gravity will shift so that, when filled to a predetermined level, the shift of the center of gravity will be so great as to cause it to tilt and discharge its contents. In some structures, the bucket is automatically restored to receiving position after the milk is discharged. In others, the bucket comprises a plurality of compartments, one of which is brought into milk-receiving position when another is moved into discharge position.

A known type of milk releaser comprises, in addition to the milk-receiving compartment, a milk-discharging compartment, there being a valve between the two compartments and a discharge valve in the milk-discharging compartment, both of which are operable by balancing and unbalancing of pressures. It is known to provide devices controlled, for example, by a float, in one compartment or the other, whereby the milk-discharging compartment is alternately connected with atmosphere and with suction, thereby causing the two valves to operate alternately, so that milk flows from the milk-receiving compartment to the milk-discharging compartment and, alternately therewith, from the milk-discharging compartment to a receptacle open to atmosphere.

While I have devised a milk-measuring device and a milk releaser each having features in common with those above described, my invention does not involve broadly their association together in proper sequence, but involves such modifications, including particularly operative connections between the same, that the milk releaser is not dependent for its operation upon the operation of floats or other similar contrivances, which have been found objectionable, and sometimes undependable, in practice.

Figure 1:
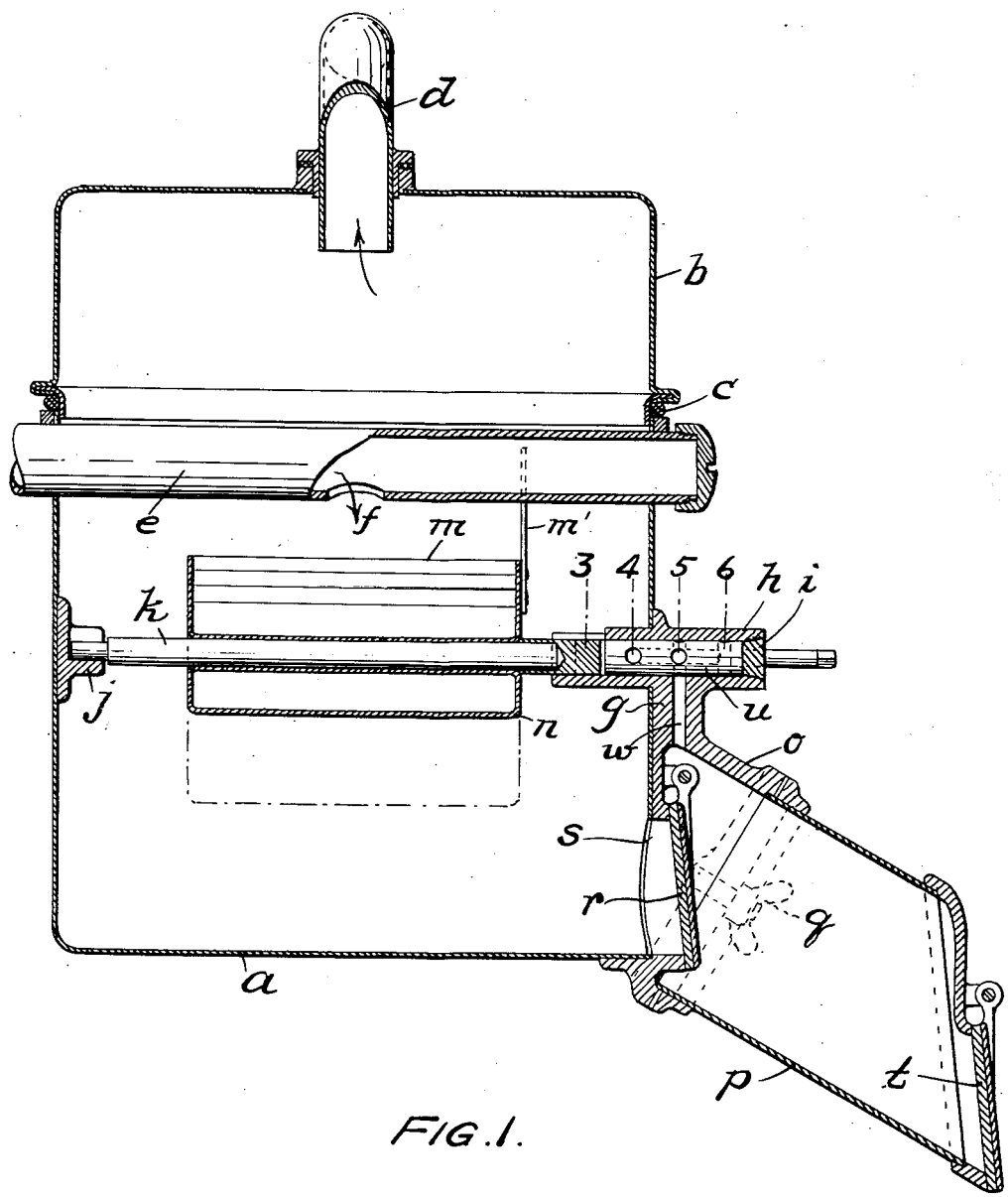
Fig. 1 is a vertical section of one form of apparatus constructed in accordance with my invention.

Figs. 3, 4, 5 and 6 are detail sectional views on the lines 3, 4, 5 and 6, respectively, showing diagrammatically the direction of the flow of air when the measuring device is in the position shown in the drawings.

Figs. 3ª, 4ª, 5ª and 6ª are views, similar to Figs. 3, 4, 5 and 6, respectively, showing the flow of air when the measuring device is in reverse position.

Fig. 7 is a perspective view of the air control valve.

In these drawings, the reference character *a* designates the body of a container, *b* the cover therefor, and *c* a gasket between the body and cover. Connected to the cover and opening into the chamber within the body and cover, and which I will hereinafter term the milk receiving chamber, is a suction pipe *d* which is connected to the suction line of a milking system. *e* is a milk pipe connected to the body *a* through which the milk passes to the milk receiving chamber through a central opening *f*.

Connected to the body $a$ is a casting $g$ having a valve casing member $h$, which extends through the wall of the body into the milk-receiving chamber, and $i$ is a screw plug for closing the outer end of the bore of the casing. The portion of the casing $h$ within the milk-receiving chamber is cylindrical in cross-section for a portion of its length, while the top of the end portion is cut away, as clearly indicated in Figs. 3 and 3ª, for the purpose hereinafter described. Secured to the inner wall of the body $a$ opposite casing $h$ and in line therewith is a member $j$, the upper portion of which is also cut away in a manner similar to the end of casing $h$. The member $j$ and end of casing $h$ form bearings for a shaft $k$, which supports the milk-measuring device, and are cut away to permit the measuring device and its shaft to be readily removed from and positioned in the milk-receiving chamber.

The milk-measuring device comprises two buckets $m$ and $n$ of triangular cross-section and formed of sheet metal. One side of each bucket is provided with a semicircular groove just above the bottom of the bucket and the grooved sides of the buckets are secured to each other and to the shaft. Connected to the ends of the buckets $m$ and $n$ are stops $m'$ and $n'$, respectively, which are arranged to engage the milk pipe $e$ to position the buckets in filling and dumping positions.

The casting $g$ is provided with a flanged spout member $o$, to which is connected a flanged end of a second spout member $p$ by means of bolts and wing nuts $q$. Pivotally supported within spout $o$ is a flap valve $r$ which is arranged to seal an outlet $s$ from the milk-receiving chamber, and $t$ is a similar valve connected to the spout member $p$ for sealing the outlet from the milk-releasing chamber formed by the spout members $o$ and $p$.

Rockably mounted in casing $h$ between the end of shaft $k$ and plug $i$ is a valve member $u$ having a tongue and groove connection with shaft $k$, so that the valve will be shifted when the measuring device is dumped, as hereinafter described.

Extending through the valve casing $h$ and communicating with the milk-receiving chamber is a port $v$. (See Sheet 3). $w$ is a similar port communicating with the milk-releasing chamber, and $x$ is a third port opening to atmosphere. The valve $u$ is provided with a central bore $y$ and three sets of ports $v'$, $w'$ and $x'$, which are arranged to be moved into register with ports $v$, $w$ and $x$, respectively. It will be noted that the ports $v'$, $w'$ and $x'$ in the valve member are drilled through the body, and all communicate with the bore $y$, which is closed to the milk-receiving chamber except through the ports. As can be seen by the drawings, there are two ports $v'$, two ports $x'$ at right angles to ports $v'$, and four ports $w'$ parallel with ports $v'$ or $x'$, thus providing double the number of ports necessary for controlling the flow of air. As the valve $u$ is provided with two sets of ports, the valve will be properly positioned to control the flow of air when the tongue and groove connection is made between shaft $k$ and the end of the valve. This is an advantage, as the operator need not exercise care in assembling to properly position the valve.

$z$ are weirs in buckets $m$ and $n$ which extend from end to end and are arranged to suddenly shift the center of gravity to dump the measuring device when the milk overflows the weir of the bucket being filled.

If desired, the end of the bore $y$ in valve $u$ may be provided with a stem A, which would protrude through a suitably packed opening in plug $i$ and which stem may be connected to a suitable counting device for keeping count of the number of buckets of milk dumped into the milk-receiving chamber, and to which also may be secured a hand dumping lever.

Figure 2:
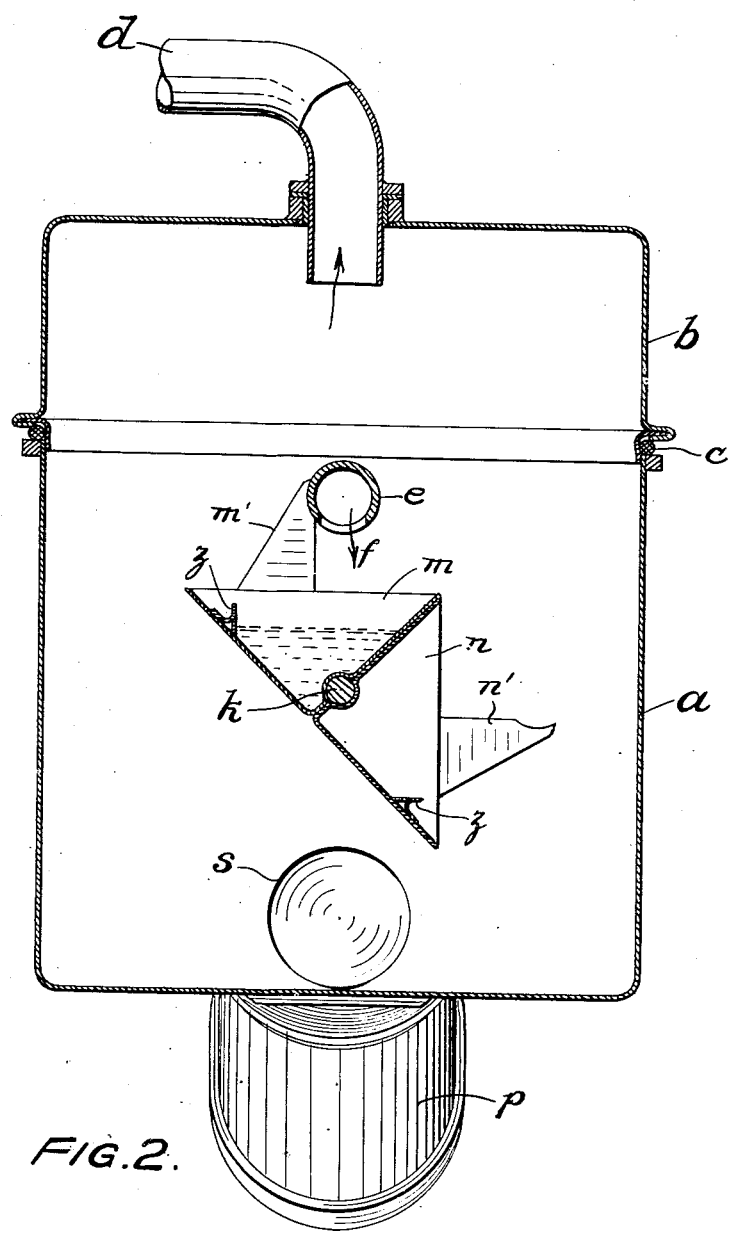
Fig. 2 is a vertical section on lines 2—2 of Fig. 1.

When assembling, the dumping device is positioned in the milk-receiving chamber, the valve $u$ is positioned, and the plug $i$ is screwed home to seal the end of the valve casing $h$. The cover $b$ is then positioned on the body $a$, and the pipes $d$ and $e$ are connected to the suction and milk lines, respectively. The suction through pipe $d$ will immediately reduce the pressure in the milk-receiving chamber as well as in the milk-releasing chamber if the measuring device is in the position shown in Fig. 2 and the valve $u$ is in the positions shown in Figs. 3–6. When the parts are in the position just described, valve $t$ will be retained in its closed position due to the lowered pressure in the releasing chamber, from which the air is being exhausted, through ports $w$, $w'$, bore $y$ and ports $v$, $v'$ by the suction through pipe $d$ connected to the milk-receiving chamber.

The milk flows from the milking machine or milking machines through pipe $e$, then to bucket $m$ through opening $f$ and gradually fills the said bucket. When the level of the milk rises slightly above the weir $z$ therein, it will flow over the weir and quickly shift the center of gravity to the left, dump bucket $m$ and bring bucket $n$ into filling position with the stop $n'$ against pipe $e$. This shifting of the buckets will rotate shaft $k$ and valve $u$ ninety degrees and change the air connections controlled by the valve to those shown in Figs. 3ª–6ª. When the valve is in this position, the milk-releasing chamber is open to atmosphere through ports $w$, $w'$, bore $y$, and ports $x$, $x'$, while the connections between the two chambers controlled directly by the valve $u$ are closed. This opening of the releasing chamber to atmosphere will increase the pressure therein, maintain valve $r$ closed by the pressure thereon in the releasing chamber, and permit valve $t$ to be opened to discharge milk therefrom, but as no milk has as yet been delivered to the releasing chamber, the said valve $t$ will not be opened. When the bucket $n$ has been filled and dumped, the valve $u$ will again be shifted to positions shown in Figs. 3–6, close the air admission port $x$ and open the milk-releasing chamber to suction, and as soon as the pressure therein has been reduced sufficiently to permit the valve $r$ to be opened by the weight of the milk in the receiving chamber, the milk will flow from the receiving chamber to the releasing chamber and be retained therein until the next shift of valve $u$ and the pressure in the releasing chamber has again been raised sufficiently to balance the atmospheric pressure on valve $t$. The measuring device is thus periodically dumped as long as the milk flows from the milk pipe. The milk flows from the receiving chamber to the releasing chamber after each alternate dump and flows from the releasing chamber after each dump between the said alternate dumps.

If it is desired to keep count of the number of dumps made during each milking, a counting device is connected to the device as above described, or a counting device may be connected so as to be actuated by valve $t$.

If it is desired to measure the milk taken from the different cows, it is necessary to attach a hand dumping lever in order to dump the bucket to which the last milk was delivered from the cow just milked, so as to place an empty bucket in position to receive the first milk from the next cow next milked.

I herein refer to a milk measuring device or vessel in the sense in which that term is applied to any vessel having a definite capacity, as, for example, a quart measure, and do not mean to necessarily imply that counting means shall be used in connection therewith to automatically record the number of measures of milk that are received and discharged by the measuring device.

Having now fully described my invention, what I claim and desire to protect by Letters Patent is:

1. In a milking machine, the combination with a milk measuring device, of a separate milk releaser having means of admission and discharge, and means actuated by the milk measuring device to control the admission of milk to, and its discharge from, the releaser.

2. In a milking machine, the combination of a compartment having a vacuum connection, a milk inlet and a milk outlet, an automatically operating milk-measuring device in said compartment and positioned to receive the milk flowing through said inlet and discharge it in measured quantities into said compartment, and means operative in the actuation of the measuring device to control the flow of milk from said compartment through said outlet.

3. In a milking machine, the combination of a compartment having a vacuum connection, a milk inlet and a milk outlet, a valve controlling said outlet, an automatically operating milk-measuring device in said compartment and positioned to receive the milk flowing through said inlet and discharge it in measured quantities into said compartment, and means controlled by the milk-measuring device to intermittently operate said valve.

4. In a milking machine, the combination of a compartment having a vacuum connection and a milk inlet, a second compartment adapted to receive milk from the first compartment, an automatically operating milk-measuring device in the first compartment, and means operative in the actuation of the measuring device to control the outflow of milk from the first compartment to the second compartment.

5. In a milking machine, the combination of a compartment having a vacuum connection and a milk inlet, a second compartment adapted to receive milk from the first compartment, an automatically operating milk-measuring device in the first compartment, a valve controlled by air pressure adapted to control the flow of milk from the first compartment to the second compartment, and means including air channels and operative in the actuation of the measuring device to apply and break down a vacuum in the second compartment and thereby effect the opening and closing of said valve.

6. In a milking machine, the combination of a compartment having a vacuum connection and a milk inlet, a second compartment adapted to receive milk from the first compartment, an automatically operating milk-measuring device in the first compartment, a valve controlled by air pressure adapted to control the flow of milk from the first compartment to the second compartment, and means including air channels and operative in the actuation of the measuring device to connect the second compartment alternately with the first compartment and with atmosphere to effect the closing and opening of said valve.

7. In a milking machine, the combination of a milk-receiving compartment adapted to be placed under suction, a milk-releasing device effecting the intermittent outflow of milk from the compartment to atmosphere, a bucket in the milk-receiving compartment adapted to initially receive the milk entering the compartment and, when filled to a predetermined amount, to tilt and discharge its contents into the compartment, and means operative in the movement of the bucket to actuate the releasing device.

8. In a milking machine, the combination of a milk-receiving compartment adapted to be placed under suction, a second compartment, a valve controlled by air pressure adapted to control the flow of milk from the first compartment to the second compartment, a bucket in the first compartment adapted to initially receive the milk and to tilt and discharge its contents when filled to a predetermined amount, and means operative in the movement of the bucket to connect the second compartment alternately with suction and atmosphere, thereby intermittently opening the valve.

9. In a milking machine, the combination of a milk-receiving compartment adapted to be placed under suction, a milk-discharging compartment, a valve between the two compartments adapted to be closed by balancing of pressures between the two compartments and opened by unbalancing of pressures, a discharge valve from the discharging compartment adapted to be closed by balancing of pressures and opened by unbalancing of pressures, a milk-measuring device in the receiving compartment and means operative thereby to connect the discharging compartment alternately with suction and atmosphere, thereby effecting the alternate opening of the two valves.

10. In a milking machine, the combination of a milk-receiving compartment adapted to be placed under suction, a second compartment, a valve operated by differential air pressure between the two compartments, a bucket in the milk-receiving compartment adapted to initially tilt and discharge its contents when filled to a predetermined amount, a shaft turning with the bucket, and ports and passages in the shaft adapted in the movement of the bucket to connect the second compartment alternately with atmosphere and with the first compartment, thereby effecting the intermittent actuation of the valve.

11. In a milking machine, the combination with a bucket so pivoted that as it fills with milk its center of gravity will shift toward a position to cause it to tilt and discharge its contents, of a weir whose overflow edge is positioned substantially above the bottom of the bucket and providing a pocket at one side of, and relatively distant from, said center of gravity; the overflow of milk into said compartment effecting a sudden shift of the center of gravity sufficient to tilt the bucket and discharge its contents.

12. In a milking machine, the combination with a milk-receiving compartment, of a bucket therein so pivoted that when filled to a predetermined level it will tilt and discharge its contents, and a dam in the bucket forming a supplemental receptacle more distant than the main bucket receptacle from the center of gravity and over which the milk is adapted to flow when filled to just below said predetermined level, thereby suddenly shifting the center of gravity of the bucket and contents.

In testimony of which invention, I have hereunto set my hand, at New York, N. Y., on this 6th day of October, 1922.

NORMAN JOHN DAYSH.

Witnesses:
R. R. WARREN,
GEO. D. TALLMAN.